(12) United States Patent
Henry

(10) Patent No.: US 12,192,174 B2
(45) Date of Patent: *Jan. 7, 2025

(54) ITERATIVE APPROACHES TO DATA AUTHORIZATION

(71) Applicant: The Western Union Company, Denver, CO (US)

(72) Inventor: Ricardo Ledezma Henry, Heredia (CR)

(73) Assignee: The Western Union Company, Denver, CO (US)

( * ) Notice: Subject to any disclaimer, the term of this patent is extended or adjusted under 35 U.S.C. 154(b) by 182 days.

This patent is subject to a terminal disclaimer.

(21) Appl. No.: 17/750,594

(22) Filed: May 23, 2022

(65) Prior Publication Data

US 2022/0278958 A1 Sep. 1, 2022

Related U.S. Application Data

(63) Continuation of application No. 16/813,419, filed on Mar. 9, 2020, now Pat. No. 11,356,414.

(51) Int. Cl.
*H04L 9/40* (2022.01)

(52) U.S. Cl.
CPC ...... *H04L 63/0245* (2013.01); *H04L 63/1416* (2013.01); *H04L 63/20* (2013.01)

(58) Field of Classification Search
CPC .. H04L 63/0245; H04L 63/1416; H04L 63/20
USPC .......................................................... 726/1
See application file for complete search history.

(56) References Cited

U.S. PATENT DOCUMENTS

| | | |
|---|---|---|
| 8,806,059 B1 | 8/2014 | Washburn et al. |
| 2009/0262659 A1 | 10/2009 | Sturges et al. |
| 2018/0091441 A1* | 3/2018 | Farmanbar .......... H04L 43/0894 |

OTHER PUBLICATIONS

International Search Report and Written Opinion for PCT/US2021/019584 mailed Jun. 7, 2021, all pages.

* cited by examiner

*Primary Examiner* — Anthony D Brown
(74) *Attorney, Agent, or Firm* — Kilpatrick Townsend & Stockton LLP

(57) ABSTRACT

Embodiments described herein relate generally to network-based threat detection mechanisms. Specifically, embodiments described herein describe a communication mechanism that filters (e.g., allows or blocks) received communications according to an iterative security list.

20 Claims, 4 Drawing Sheets

ITERATIVE APPROACHES TO DATA AUTHORIZATION

CROSS-REFERENCE TO RELATED APPLICATION

The present application is a continuation of U.S. patent application Ser. No. 16/813,419, filed Mar. 9, 2020, the entire contents of which are incorporated herein by reference for all purposes.

BACKGROUND

More and more everyday data networks are becoming a part of everyday life. Data networks may be utilized for a myriad of purposes including, but not limited to streaming video, conducting transactions, cellular communications, and the like. As data networks become more integrated into our society so do the risks associated with these data networks. For example, a hacker may attempt to impersonate a mobile device in a cellular communication network for a nefarious reason. With thousands of communications happening across data networks every day, there is a need for a system that is able to iteratively determine if a communication is a threat.

BRIEF SUMMARY OF THE INVENTION

Techniques disclosed herein describe systems, non-transitory mediums, apparatuses, and methods for blocking one or more received communications. A method may include generating, by a communications mechanism, an iterative rule list comprising a sequential set of access control rules. The method may further include applying, by the communications mechanism, the iterative rules list to a filtering mechanism. The method may further include receiving, by the filtering mechanism, a first communication. The method may further include determining, by the filtering mechanism, an iteration value identifying a number of iterations to perform based on the iterative rule list. The method may further include identifying, by the filter mechanism, a first attribute associated with a first iteration rule within the iterative rule list. The method may further include parsing, by the filtering mechanism, the first communication to determine a first communication attribute. The method may further include comparing, by the filtering mechanism, data associated with the first communication attribute to data associated with the first attribute to determine a first positive match. The method may further include based at least in part on the first positive match, blocking the first communication from being received at a destination.

In one embodiment, the method may further include identifying, by the filter mechanism, a second attribute associated with a second iteration rule within the iterative rule list. The method may further include parsing, by the filtering mechanism, the first communication to determine a second communication attribute, wherein the second communication attribute is different from the first communication attribute. The method may further include comparing, by the filtering mechanism, data associated with the second communication attribute to data associated with the second attribute to determine a second positive match. The method may further include in response to the first positive match and the second positive match, blocking the first communication from being received at a destination.

In one embodiment, the method may further include identifying, by the filter mechanism, a first variable associated with the first variable first iteration within the iterative rule list. The method may further include parsing, by the filtering mechanism, the first communication to determine a first communication variable associated with the first communication attribute. The method may further include comparing, by the filtering mechanism, data associated with the first communication variable to data associated with the first variable to determine the first positive match.

In one embodiment, the first attribute is a genus, and the first variable is a species of the genus. In one embodiment, the first communication comprises a request to access a dataset in a remote database. In one embodiment, the first communication comprises a request to transmit peer-to-peer communication. In one embodiment, the first attribute indicates a type of device that was used to generate the first communication.

DETAILED DESCRIPTION OF THE INVENTION

Figure 1:
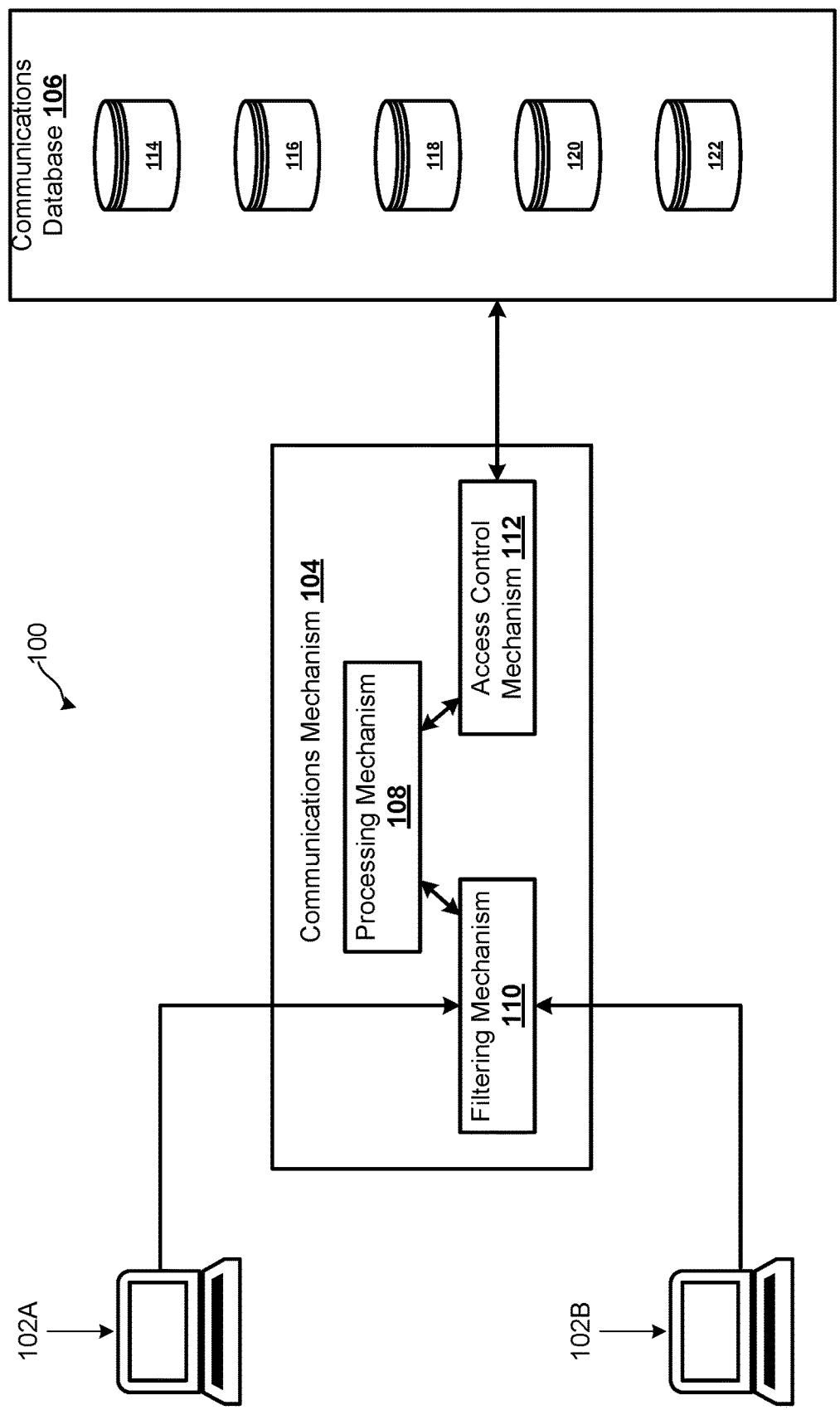
FIG. 1 illustrates an example network in accordance with one or more embodiments described herein.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration". Any embodiment or design described herein as "exemplary" is not necessarily to be construed as preferred or advantageous over other embodiments or designs.

Embodiments described herein relate generally to network-based threat detection mechanisms. Specifically, embodiments described herein describe a communication mechanism that filters (e.g., allows or blocks) received communications according to an iterative security list. The iterative security list may be generated by an access control mechanism from previously received communications. A communications database may store one or more sets of previously received communications associated with a network. Each previously received communication may comprise a binary value and one or more attributes (e.g., data attributes). The binary value may indicate if the communication was erroneous. An erroneous communication may be a communication that was found to be fraudulent, unauthorized, containing malware, and/or containing some other undesirable characteristic. One or more attributes may indicate data describing one or more characteristics of a communication. For example, an attribute may be the device type of a device that initiated a communication.

The access control mechanism stores, in different data partitions, communication information based on communications within the communications database. The access control mechanism identifies from the binary value and the one or more attributes, relevant communication information to place in particular data partitions. Each data partition may be associated with an attribute. For example, there may be a first data partition that stores communication information associated with a device type. The communication information in the first data partition identifies one or more variables associated with the device type and the binary value related to the one or more variables. For example, the first data partition may contain the variables of iPhone and Android as well as the number of communications associated with each variable with a binary value of 0 and a binary value of 1. The following is an example data entry within the first partition:

TABLE 1

| Variable | Binary Value 1 | Binary Value 0 |
|----------|----------------|----------------|
| iPhone   | 235237         | 17200          |
| Android  | 262435         | 20959          |

Table 1 indicates that of communications sent by iPhone devices, 235237 of those communications are not erroneous, while 17200 of those communications are erroneous. Each partition within the communication database may contain communication information based on an attribute associated with past communications.

From communication information in different data partitions, the access control mechanism calculates a Weight of Evidence (WoE) of each variable within a data partition. The WoE of each variable indicates the predictive power of a variable in relation to the attribute of the data partition. The WoE may be utilized to determine which variable has the greatest predictive power when determining an erroneous communication based on a particular attribute. For example, the WoE may indicate if a communication from an iPhone or Android device (i.e., variables) is more likely to indicate an erroneous communication when determining an erroneous communication based on device type (i.e., attribute).

The access control mechanism calculates an Information Value (IV) for each data partition. The IV of a data partition indicates the predictive strength of an attribute. Since each data partition corresponds to an attribute, the IV can be compared across different data partitions to determine which attribute is the strongest indicator of an erroneous communication. For example, the IV may indicate if the attribute of a device type is a better indicator of an erroneous communication than the attribute of Internet Protocol (IP) address.

Based on the WoE and IV, access control mechanism calculates an iterative security list. The iterative security list may be a set of access control rules that can be applied by a filtering mechanism of the communications mechanism in order to accept or reject communications. The iterative security list may contain an iterative set of rules based on WoEs and IVs associated with different attributes. Based on the IVs associated with each attribute, an ordered list may be determined that indicates the likelihood of a particular attribute indicating fraud or some other error. For example, according to IVs, a device type may be most likely to indicate an erroneous communication, IP address may be the second most likely to indicate an erroneous communication, and so forth. Next, the WoEs associated with each attribute may indicate the best predictor variable. For example, according to WoE, within device types, the device type of iPhone may be the most likely to indicate an erroneous communication. Based on the previous two examples, an iterative security list may be generated that instructs the filtering mechanism to determine if an iPhone was utilized to initiate a received communication. If the filtering mechanism returns a positive identification, then the filtering mechanism flags the communication as erroneous.

As the name suggests, the iterative security list may contain iterative rules. When considering the last example, the determination of if an iPhone was used to initiate a received communication may be a first iteration performed by the filtering mechanism. A second iteration may be performed by the filtering mechanism based on the attribute with the second highest IV and the variable associated with that attribute. For example, after determining if an iPhone was used to initiate the communication, a second determining may be conducted to determine if the IP address that originated the communication was located in country A. In such an example, country A may, based on its WoE, be the best variable for predicting an error based on IP address. Thus, if both iterations (the first based on device type and the second based on IP address), indicate that a communication is erroneous then the communication can be blocked. The highest (i.e., first) layers of the iterative security list indicate the strongest likelihoods of erroneous communications.

The filtering mechanism may be set to a certain number of iterations based on the security requirements of the communication mechanism. Due to the complex calculations that are done prior to receiving communications, the filtering mechanism may quickly determine if a communication is likely to be erroneous. Such a process is an improvement on filtering or access control devices that attempt to do real-time rule generation based on vast data sets. These such devices may require numerous computational resources to determine real-time rules. However, the techniques described herein allow for a filtering mechanism to quickly and accurately perform real-time risk analysis based on previously performed calculations, which undoubtedly saves computing resources and increases the speed of threat determination within a network.

In addition, the filtering mechanism may perform a plurality of threat detection iterations to improve the accuracy of threat determination. The iterative security list that is applied to the filtering mechanism has a plurality of layers and as each layer is executed it is more likely that a communication is erroneous. For example, a first layer may indicate a 60% chance of error based on an attribute, but a first and second layer (combined) may indicate a 75% chance of error based on two attributes. This customizable solution may allow a user to sacrifice speed of the filtering mechanism for increased accuracy, as the execution of more layers may take more time and computational resources. Thus, the techniques described herein describe a customizable filtering mechanism that offers improvements in the field of network security. Furthermore, the techniques disclosed herein provide an improvement over access control devices (e.g., network gateways) that perform complex, computational expensive real-time rule generation.

FIG. 1 illustrates an example computer network 100 according to one or more embodiments described herein. Computer network 100 comprises user devices 102A-102B, communications mechanism 104, and communications database 106. User devices 102A-102B can be connected to communications mechanism 104 by various means including, but not limited to, a wide area network (WAN), a local area network (LAN), an Ethernet network, a public or private network, a wired network, a wireless network, the Internet, and combinations thereof. Similarly, communications mechanism 104 and communications database 106 may be connected by various means including, but not limited to, a WAN, a LAN, an Ethernet network, a public or private network, a wired network, a wireless network, the Internet, and combinations thereof. In one embodiment, communications mechanism 104 and/or communications database 106 may be owned and/or operated by a single entity, such as WESTERN UNION. In one embodiment, communications database 106 may be operated by a third-party entity that is different than the entity that operates communications mechanism 104.

User devices 102A-102B may comprise one or more processors and non-volatile memory. The processor(s) may include single or multicore processors. The processors may operate under the control of software stored in the associated non-volatile memory. Processor(s) within user devices 102A and 102B may execute one or more applications to transmit and receive communications (i.e., electronic communications) in computer network 100. In some embodiments, one or more applications executed by user device 102A (or 102B) may generate and transmit communication to communications mechanism 104. The communication may be a communication for a financial transaction (e.g., transferring money from one account to another, payment for a good), a web-based action (e.g., loading a web-page, connecting to a virtual private network, and the like), a peer to peer communication (e.g., a social media message, an electronic mail (e-mail) communication, a text message, a voice-over-IP message, and the like), and other types of communications. These transmitted communications may be received and processed by communication mechanism 104.

User devices 102A-102B may include various types of computing systems, such as portable handheld devices, personal computers, laptops, tablets, cellular phones, smart phones, workstation computers, wearable devices, thin clients, and the like. These computing devices may run various types and versions of software applications and operating systems such as Linux or Linux-based operating systems. Although two user devices are depicted, it is within the scope of the disclosures described herein to have multiple user devices within computer network 100.

Communications mechanism 104 may comprise one or more processors (e.g., processing mechanism 108, filtering mechanism 110, and/or access control mechanism 112) and non-volatile memories. The processor(s) may include single or multicore processors. The processors may operate under the control of software stored in the associated non-volatile memory. Processor(s) within communications mechanism 104 may execute one or more applications to transmit and receive communications (i.e., electronic communications) in computer network 100. Communication mechanism 104 may be responsible for receiving communications from one or more sources (e.g., user devices 102A-102B), determining if a received communication is erroneous, and determining whether to forward the received communication to one or more destinations or to block the received communication. A destination may be a server or system that performs one or more actions based on a communication. For example, a destination may be a web server that in response to a communication facilitates the loading of a web-page on a source device (e.g., user device 102B). In another example, a destination may be an application server that in response to a communication performs one or more operations based on stored business logic. In yet another example, a destination may be a financial processing system that in response to a communication processes a payment or financial transaction. To facilitate one or more embodiments described, communications mechanism 104 may utilize one or more of processing mechanism 108, filtering mechanism 110, and access control mechanism 112. In one embodiment, one or more components of communications mechanism 104 may be implemented as a proxy, firewall, or other access control device.

Processing mechanism 108 may comprise one or more processors and non-volatile memories. The processor(s) may include single or multicore processors. The processors may operate under the control of software stored in the associated non-volatile memory. Processing mechanism 108 may control one or more operations of communications mechanism 104. For example, processing mechanism 108 may instruct filtering mechanism 110 on how many iterations to perform when performing a filtering function. In another example, processing mechanism 108 may instruct access control mechanism 112 when to update or generate an iterative security list to be later utilized by filtering mechanism 110. In one embodiment, processing mechanism 108 may be a master controller of communications mechanism 104.

Filtering mechanism 110 may comprise one or more processors and non-volatile memories. The processor(s) may include single or multicore processors. The processors may operate under the control of software stored in the associated non-volatile memory. Filtering mechanism 110 may, utilizing an iterative security list, set one or more access control rules for received communications. Filtering mechanism 110 may determine, based on the access control rules, if a received communication or group of received communications should be forwarded to a destination, blocked, or flagged for further review. At the instruction of processing mechanism 108, filtering mechanism 110 may dynamically alter, based on various factors, how many iterations (e.g., how many rules to apply) it may perform on a received communication. Various factors may include one or more attributes of a received communication. For example, received communications associated with country A may have two or more iterations applied whereas communications associated with country B may have one iteration applied. Such a determination may be based on the security rating of country A and country B. Additional various factors may include current network conditions. For example, if communications mechanism 104 is receiving a high number of communications, then the number of iterations may be reduced to provide quick processing of the received communications.

Access control mechanism 112 may comprise one or more processors and non-volatile memories. The processor(s) may include single or multicore processors. The processors may operate under the control of software stored in the associated non-volatile memory. Access control mechanism 112 accesses communications database 106 to generate or update an iterative security list. The iterative security list sequentially describes the greatest factors that will be used by filtering mechanism 110 to determine if a received communication is erroneous and should be blocked. In one embodiment, for every set time period (e.g., 1 month), as determined by processing mechanism 108, access control mechanism 112 may update the iterative security list based on new or updated data within communications database 106.

Communications database 106 may store within memory one or more previous communications associated with computer network 100. The memory within communications database 106 may comprise non-volatile memory, such as, a solid-state drive (SSD) and the like. The previous communications associated with computer network 100 may be communications previously received by communications mechanism 104 or another communication mechanism operated by the same entity that operates communications mechanism 104. Each communication in communications database 106 may comprise a plurality of attributes and an associated binary value. The attributes are characteristics of a communication and may vary between communications. The binary value is a value that indicates if the communication was decided to be erroneous or not. For example, a binary value of 0 may indicate a communication is erroneous, while a binary value of 1 may indicate a communication is not erroneous.

The determination of an erroneous communication may be determined by a plurality of methodologies including, but not limited to, machine-based technologies (e.g., machine learning algorithms), human-based inquiries (e.g., a decision by human being), result-based methodologies (e.g., as a result of a communication where a charge-back was initiated, as a result of a communication a system was infected with malware, and the like), and/or a combination of the previously listed techniques. The determination of an erroneous communication may be performed by a third-party at a location remote to computer network 100.

One or more attributes of a communication may include, but not be limited to, a device type that initiated a communication, a device operating system of a device that initiated a communication, value of a communication, user identifier associated with the device that initiated a communication, IP address associated with a device that initiated a communication, language of one or more operating systems or programs operating on a device that initiated a communication, an email domain associated with a communication, a location associated with a device that is the intended recipient of a communication, a device operating language (e.g., English, Spanish, German), a value associated with a communication, an IP type associated with a communication (e.g., residential, cellular, traveler), a financial institution (e.g., a bank) associated with a communication, a cellular service associated with a communication, if the communication was received from a proxy, an Internet Service Provider (ISP) associated with a communication, a time a day a communication was created (e.g., hour of day, day of week, and the like), number of days since a device that originated a communication last transmitted a communication, number of days since a device associated with a communication was approved to transmit a communication by communication mechanism 104, number of devices associated with a user identifier that have been used in a time period, and the like.

One or more attributes of a communication may include, but not be limited to, a device type that initiated a communication, a device operating system of a device that initiated a communication, value of a communication, user identifier associated with the device that initiated a communication, IP address associated with a device that initiated a communication, language of one or more operating systems or programs operating on a device that initiated a communication, an email domain associated with a communication. One or more attributes may also be determined based on a group of previous communications. For example, one or more attributes may include, but not be limited to, how often a user device has sent a communication of a set time period (e.g., 5 communications over the last 30 seconds), percentage of communications associated with a user from a particular IP address (e.g., user A sends 90% of communications from IP address y), a number of devices associated with a particular user identifier (e.g., communication associated with e-mail x have been sent from 20 different user devices), total value of communications associated with a particular user or particular device over a particular period of time, a user tenure associated with a user identifier (e.g., how long a user has sent communications via a particular service), country/state/city associated with a user identifier and/or a receiver of communications, a payment type associated with a user identifier (e.g., a Visa, Mastercard, credit card, debit card, prepaid card, etc.), a web browser operating within a device operating system (e.g., Firefox, Chrome, Opera, etc.), and the like.

Communications database 106 also comprises a plurality of data partitions 114-122. Access control mechanism 112 may retrieve communications from communications database 106 and store, in different data partitions, communication information based on retrieved communications. In such an embodiment, access control mechanism 112 identifies from the binary value and the one or more attributes of a communication, relevant communication information to place in particular data partitions. Each data partition may be associated with an attribute. For example, data partition 114 may contain communication information associated with the attribute device type, data partition 118 may contain communication information associated with the attribute value (e.g., value associated with communications), data partition 120 may contain communication information associated with the attribute origination location, and data partition 122 may contain communication information associated with the attribute destination location. Although only a few data partitions are shown in FIG. 1, it is within the scope of embodiments described herein to have hundreds or thousands of partitions. By putting communication information into different partitions, access control mechanism 112 may be able to derive how important each attribute is in determining if a received communication is erroneous.

Data partitions 114-122 may be physical (or virtual) data partitions within communications database 106 that contain separate access control mechanisms (e.g., passwords, encryption keys, etc.) By partitioning the data within communications database 106 based on an attribute, communication mechanism 104 may accurately and quickly determine which variables have the greatest impact on the determination of whether a communication is erroneous. For example, using partitions, access control mechanism 112 may process communication information from each of these partitions in parallel, in part, because each data source is independent, as opposed to attempting to retrieve large amounts of data from a central data repository, which may result in a bottleneck. In one embodiment, access control mechanism 112 may comprise a plurality of processors and each processor may be associated with a single partition to improve the parallel computing capabilities of access control mechanism 112.

Figure 2:
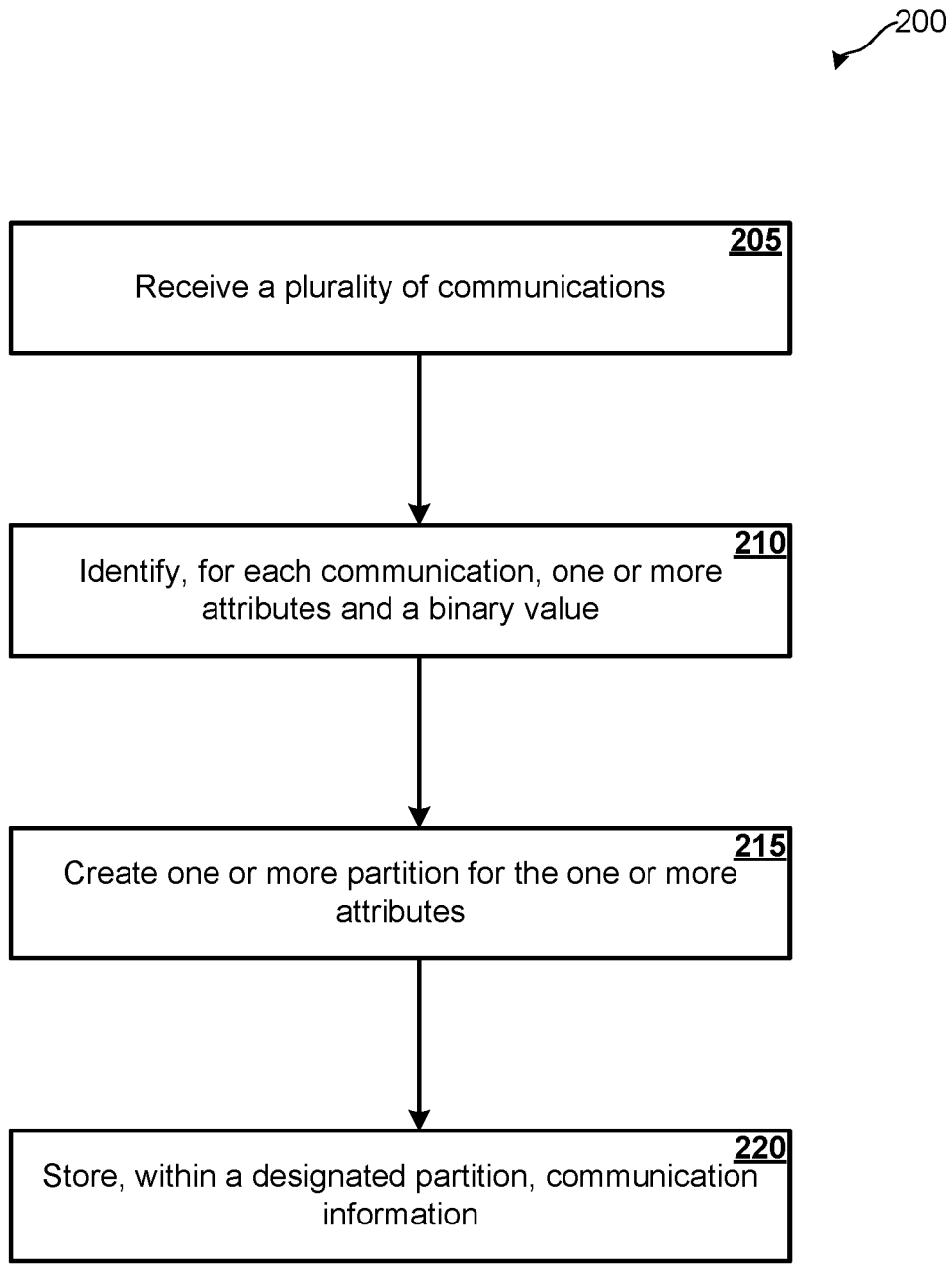
FIG. 2 illustrates a first example process in accordance with one or more embodiments described herein.

FIG. 2 illustrates an example process 200 in accordance with one or more embodiments described herein. Process 200 may be performed by one or more components of computer network 100 of FIG. 1. For example, one or more operations of process 200 may be performed by one or more parts of communications mechanism 104, such as, access control mechanism 112.

At 205, the communication mechanism receives a plurality of communications. The plurality of communications may be past communications associated with one or more computer networks such as a payment network operated by WESTERN UNION. The plurality of communications may be stored in a communications database. In one embodiment, the communications database may only store communications of a certain age (e.g., 3 months to 2 years old, 1 month to 1 year old, etc.). As a result, communications within the communications database, in some embodiments, may not be the most recent communications (e.g., communications must be at least a month old to be stored in the communications database). Such storage techniques may be useful because a certain time period may be needed to realize a binary value associated with a communication. For example, a communication may be sent at a particular time, but it may not be determined that that particular communication was responsible for infecting a destination with a virus until months later. If this communication were in the communication database, it may be falsely identified as being non-erroneous. Thus, by not relying on the most recent of communications, the binary value associated with the communications within the communications database can be more accurate.

At 210, the communication mechanism identifies, for each communication of the plurality of communications, one or more attributes and a binary value. The attributes of a communication may be determined by looking at data within the actual communication and/or data associated with the actual communication. The binary value may be a value that indicates if it has been previously determined if a communication is erroneous.

At 215, the communication mechanism creates one or more partitions for the one or more attributes. A physical or virtual partition may be created to store communication information associated with an attribute. In one embodiment, the one or more partitions are stored within a communication database that also stores the plurality of communications. In one embodiment, the one or more partitions are created at a location remote to a communication database such as a memory internal or external to communication mechanism.

At 220, the communication mechanism stores, within a designated partition, communication information. Communication information may be based upon various calculations performed by a communication mechanism. Communication information may be stored according to a variable that is associated with an attribute. Communication information may include, with respect to a variable, a number of erroneous communications, a number of non-erroneous communications, a distribution value of erroneous communications, a distribution value of non-erroneous communications, a proportion value, a WoE, and/or IV.

Figure 3:
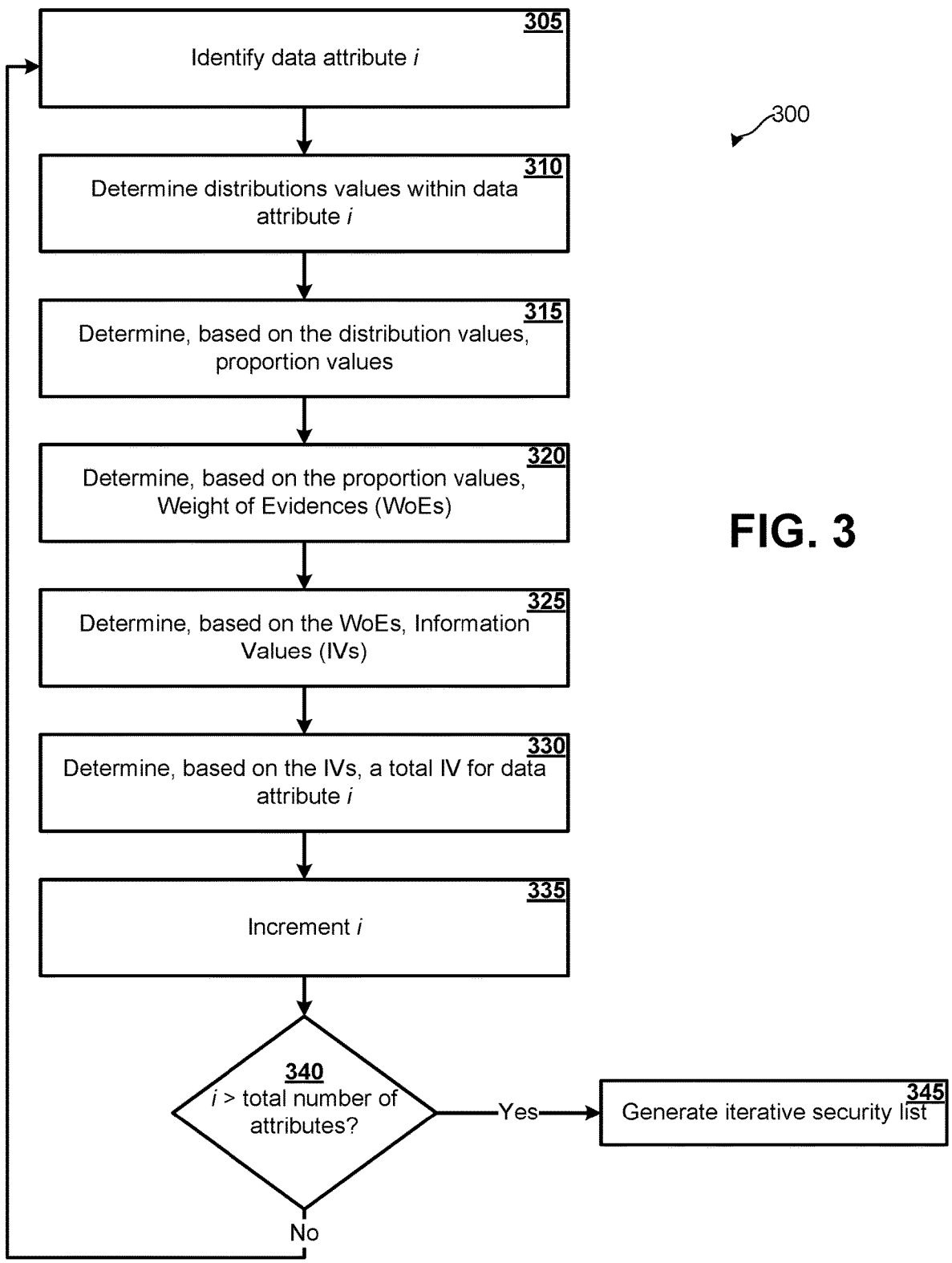
FIG. 3 illustrates a second example process in accordance with one or more embodiments described herein.

FIG. 3 illustrates an example process 300 in accordance with one or more embodiments described herein. Process 300 may be a process for generating an iterative security list from an entry within a data partition. Process 300 may be performed by one or more components of computer network 100 of FIG. 1. For example, one or more operations of process 300 may be performed by one or more parts of communications mechanism 104, such as, access control mechanism 112.

At 305, the communications mechanism identifies data attribute i. The variable i may be initialized to the value of 1. Each communication may have a plurality of attributes. Each attribute also is associated with a plurality of variables. The communication mechanism may scan communications to determine which attributes the communication contains. For example, some communication may detail a device type, a browser type, a value, and the like. In another example, some communications may not detail a device type or other attribute. The communications mechanism scans each communication and identifies the relevant attributes to a particular attribute and puts that communication in a particular group (e.g., data partition) for further analysis based on that particular attribute. It should be noted that a communication may be represented in several different partitions so long as the communication is associated with the particular attribute of the particular partition.

At 310, the communication mechanism determines distribution values within data attribute i. A distribution value may be determined from a binary value associated with a communication. The distribution value may be calculated by determining how many erroneous communications and non-erroneous communications are associated with each variable. For example, data attribute i may be the attribute device type, which identifies the type of device that initiated a communication. In such an example, the communication mechanism may determine how many communications sent from a particular device were erroneous or non-erroneous based on the associated binary. A result of such an analysis is shown below in Table 2.

TABLE 2

| Variables | Binary Value 1 | Binary Value 0 | Distribution of Good | Distribution of Bad |
|---|---|---|---|---|
| iPhone | 235237 | 17200 | 46.99% | 43.84% |
| Pixel | 262435 | 20959 | 52.42% | 53.42% |
| Galaxy | 2693 | 872 | 0.54% | 2.22% |
| Moto | 239 | 201 | 0.05% | 0.51% |
| Total | 500604 | 39232 | | |

As shown in Table 2, the distribution values indicated the percent of good (i.e., non-erroneous) communications and bad (i.e., erroneous) communications with respect to certain variables associated with the attribute device type. For example, out of the 500604 communications that contain a device type attribute (e.g., communication identifies the sending device type) 46.99% of the non-erroneous communications came from an iPhone device, while 53.42% of erroneous communications came from a Pixel device. The distribution values represent the percentage of communications that are good or bad with respect to a variable from the total good and bad with respect to an attribute.

At 315, the communication mechanism determines, based on the distribution values, proportion values. Having the distribution values, the communication mechanism can calculate the proportion of good vs bad transactions associated with an attribute by dividing the distribution of good by the distribution of bad for each variable. If the distribution of bad is greater than the distribution of good, the proportion value will be less than 1 and if the distribution of good is greater than the distribution of bad, the proportion value will be greater than 1. A result of such calculation is shown below in Table 3.

TABLE 3

| Variables | Binary Value 1 | Binary Value 0 | Distribution of Good | Distribution of Bad | Proportion Value |
|---|---|---|---|---|---|
| iPhone | 235237 | 17200 | 46.99% | 43.84% | 1.072 |
| Pixel | 262435 | 20959 | 52.42% | 53.42% | 0.981 |
| Galaxy | 2693 | 872 | 0.54% | 2.22% | 0.242 |
| Moto | 239 | 201 | 0.05% | 0.51% | 0.093 |
| Total | 500604 | 39232 | | | |

In Table 3, using Moto as an example, for each bad (i.e., erroneous) communication sent using a Moto device there are 0.093 good (i.e., non-erroneous) communications. Such a proportion value indicates that the concentration of bad communications is higher in comparison to good communications with respect to other variables associated with the attribute of device type.

At 320, the communications mechanism determines, based on the proportion values, a WoE for multiple variables. The WoE indicates the separation power between the good and bad communications associated with an attribute. To calculate the WoE, the communications mechanism takes the natural logarithm of the proportion value. By taking the natural log of the proportion value, the WoE will be negative if the corresponding proportion value is less than 1 and the WoE will be positive if the corresponding proportion value is more than 1. The more negative the WoE, the more bad communications are associated with a variable. The more positive the WoE, the more good communications are associated with a variable. A result of WoE calculates are shown below in Table 4.

TABLE 4

| Variables | Binary Value 1 | Binary Value 0 | Distribution of Good | Distribution of Bad | Proportion Value | WoE |
|---|---|---|---|---|---|---|
| iPhone | 235237 | 17200 | 46.99% | 43.84% | 1.072 | 0.069 |
| Pixel | 262435 | 20959 | 52.42% | 53.42% | 0.981 | −0.019 |
| Galaxy | 2693 | 872 | 0.54% | 2.22% | 0.242 | −1.419 |
| Moto | 239 | 201 | 0.05% | 0.51% | 0.093 | −2.373 |
| Total | 500604 | 39232 | | | | |

From Table 4, in this example, the WoE of Moto is very negative, which indicates there are a lot of erroneous messages associated with that variable as compared to the iPhone.

At 325, the communications mechanism determines, based on the WoEs, IVs for each variable. The IV of the overall predictive power of an attribute is based on its variables. The communications mechanism calculates the IV by subtracting the distribution of good value from the distribution of bad value and multiplying the result by the WoE. For example, according to Table 4, for the Pixel device, the IV may be calculated by the following (0.5242−0.5342)*−0.019=0.00019. If a variable does not have a big separation between a distribution of good value and a distribution of bad value the WoE will be close to 0, which in turn causes the IV to be also close to 0. In one embodiment, a higher IV represents a better predictor of erroneous communications.

At 330, the communications mechanism determines, based on the IVs, a total IV for data attribute i. The IV is added together for all variables for the attribute and can then be compared to other attributes. This way the attribute with the highest IV value may be considered the best indicator of an erroneous contribution, the second highest IV value may be considered the second-best indicator of an erroneous communication, and so forth. Table 5, as illustrated, depicts sample IV values.

TABLE 5

| Variables | Binary Value 1 | Binary Value 0 | Distribution of Good | Distribution of Bad | Proportion Value | WoE | IV |
|---|---|---|---|---|---|---|---|
| iPhone | 235237 | 17200 | 46.99% | 43.84% | 1.072 | 0.069 | 0.002 |
| Pixel | 262435 | 20959 | 52.42% | 53.42% | 0.981 | −0.019 | 0.000 |
| Galaxy | 2693 | 872 | 0.54% | 2.22% | 0.242 | −1.419 | 0.024 |
| Moto | 239 | 201 | 0.05% | 0.51% | 0.093 | −2.373 | 0.011 |
| Total | 500604 | 39232 | | | | | 0.037 |

Multiple data points described by process 300 may be considered communication information associated with an attribute. For example, the data points within Table 5 may all be considered communication information. Once communication information for a particular attribute has been determined, it may be saved in a particular data partition. The particular data partition may only store communication information and/or communications associated with a particular attribute. Furthermore, although process 300 has been described using the attribute of device type, any and all attributes may be broken down in a similar matter such that each attribute will have a data entry similar to what is shown in Table 5. For example, there may be a data entry in a partition associated with the attribute of value. In such an example, the variables for value may be different value ranges such as 0-50, 51-100, 101-200, 201+, and the like. For each of these variables, distribution values, proportion values, WoEs, and IVs may be calculated.

At 335, the communication mechanism increments variable i. By incrementing variable i the process of determining communication information associated with another attribute may be performed, pending the decision at 340.

At 340, the communications mechanism compares variable i to the total number of attributes. Process 300 creates communication information for as many attributes as needed. For example, there may be 1000 attributes that can be identified based on received communication. In such an instance processes associated with process 300 may be performed 1000 different times and each iteration of process 300 may be for a different attribute. If at 340, variable i is greater than the total number of attributes then at 345, the communications mechanism outputs an iterative security list based on the IV values of attributes. Otherwise, process 300 returns to 305.

The iterative security list may comprise a set of iterative rules (i.e., layers). The first or primary iteration may be associated with the attribute with the highest IV and the variable associated with that attribute that has the most negative WoE. Table 6 illustrates an example iterative security list.

TABLE 6

| IV Score | Attribute | WoE Score | Variable | Iteration |
|---|---|---|---|---|
| 0.037 | Device Type | −2.373 | Moto | 1 |
| 0.035 | Value | −5.05 | 500+ | 2 |
| 0.031 | Sending Device Location | −7.06 | Country X | 3 |
| 0.020 | Devices associated with same sender | −1.01 | 2-5 devices | 4 |

As illustrated in Table 6, an iterative security list may pinpoint a certain attribute and variable combination to look for in each iteration. For example, during a first iteration, the communications mechanism may parse a communication to determine if a communication is sent from a Moto device. In the same example, during a second iteration, the communications mechanism may determine if the same communication corresponds to a value of 500+. As a result, a received communication may be analyzed several times (i.e., multiple iterations). In one embodiment, a subsequent iteration is only performed if a prior iteration is positive. For example, the fourth iteration may only be performed if during the third iteration, the communications mechanism determines the sending device's location is country X.

Figure 4:
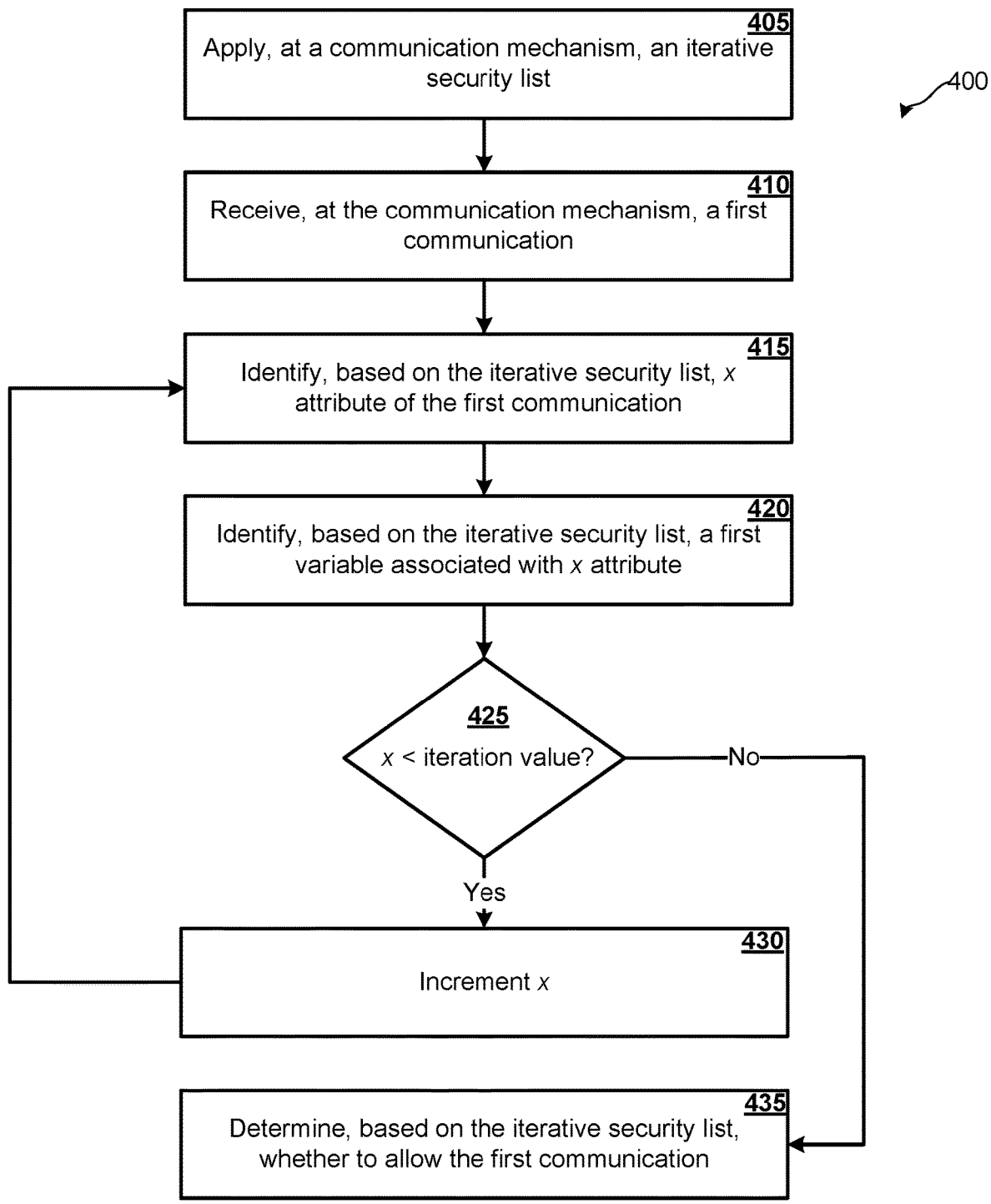
FIG. 4 illustrates a third example process in accordance with one or more embodiments described herein.

FIG. 4 illustrates an example process 400 in accordance with one or more embodiments described herein. Process 400 may be a process for determining whether to block or allow a received communication. Process 400 may be performed by one or more components of computer network 100 of FIG. 1. For example, one or more operations of process 400 may be performed by one or more parts of communications mechanism 104, such as, filtering mechanism 110.

At 405, the communications mechanism applies an iterative security list. The iterative security list contains various layered rules that may be applied in a sequential order in order to determine if a received communication is erroneous or not. The iterative security list may be generated based on operations associated with process 300. The iterative security list may be in the form of computerized code such that it may be applied to one or more hardware and/or software mechanisms of the computation mechanism.

At 410, the communications mechanism receives a first communication. The first communication may be received from a remote user device that communicates with the communications mechanism via a network such as the Internet. In one embodiment, the first communication may be part of a package of communications, such as a package of transactions associated with a retailer. In one embodiment, the first communication may be a part of a package of communications that were received at a different location (other than the communications mechanism) but were later forwarded to the communications mechanism for data analysis (i.e., to determine erroneous communications). The communications mechanism may act as a gateway or firewall between one or more user devices and one or more destinations, such that communications to a destination are first received by the communication mechanism. In such an embodiment, the communications mechanism may prevent malware, unauthorized transactions, and the like from reaching a destination, which improves the security of the destination without additional software or hardware being integrated at the destination.

At 415, the communications mechanism identifies, based on the iterative security list, a first attribute of the communication. The first attribute may be identified by parsing information within the received communication to determine one or more attributes of the communication. The iterative security list comprises an iterative set of attribute and variable combinations that are used by the communications mechanism to identify an erroneous communication. In one embodiment, all received communications may be associated with the same iterative security list. In one embodiment, portions of received communications may be associated with different iterative security lists. For example, when a received communication is received via a virtual private network a proxy there may be a special iterative security list for such communications. The special iterative security list may have entries that are specific to detecting erroneous communications that are associated specifically with virtual private networks and/or proxies as opposed to a general iterative security list which is used for general communications. In another example, there may be special iterative security lists for communications received from certain countries, persons, or companies. These special iterative security list may include self-compliance and/or government-based compliance rules. For example, country X may not allow transactions over 1 million dollars to country Y. Such a law may be embodied within a special iterative security list. Regardless of the type of iterative security list used, the communications mechanism will identify which attribute it is looking for (in accordance with a respective iterative security list) and identify that particular attribute.

At 420, the communications mechanism identifies, based on the iterative security list, a first variable associated with the first attribute. For example, the first attribute may be the operating system language of the sending device and the first variable may be Spanish. Thus, the communications mechanism will determine based on parsed data from the first communication, if the sending device of the first communication had an operating system language of Spanish. If the sending device of the first communication does not have an operating system language of Spanish, then it may indicate the communication is erroneous, and another iteration may be performed, the communication may be blocked, or the communication may be flagged for further human review.

At 425, the communications mechanism determines if additional attributes need to be analyzed based on an iteration value. The iteration value may be set based on preference and it indicates to the communications mechanism how many iterations to go. As described in some embodiments herein, the iterative security list is designed such that the first iteration is performed based on the combination of an attribute and variable that is most likely to indicate a communication is erroneous. Such a configuration may save time when determining if a communication is erroneous (because only one rule or iteration is needed to determine erroneous communications). However, to improve the accuracy of an erroneous communication, the iteration value may be set to higher than 1 so that more iterations can be performed. Although each subsequent iteration by itself may be less likely to indicate an error (as opposed to the primary iteration) the combination of performing a subsequent iteration after a previous iteration may increase the accuracy of the determination because the determination is based on more factors (i.e., attribute and variable combinations). For example, it may be 80% likely that a communication is erroneous after one iteration, but it may be 86% likely that a communication is erroneous after 4 iterations. If, at 425, additional attributes need to be analyzed, process 400 moves to 430. However, if additional attributes do not need to be analyzed, process 400 moves to 435.

At 430, the communications mechanism increments the attribute/variable. By incrementing this variable, a new attribute/variable combination may be analyzed in the same received communication.

At 435, the communications mechanism determines, based on the iterative security list, whether to allow the first communication. The determination may be based on if the attribute and variable combination, as detailed in the iterative security list, is true for a given number of iterations. For example, with reference to Table 6, if data from the first communication indicates that the device type used to send the first communication is a Moto device and the iteration value is 1, then the communications mechanism may block the first communication and label the communication as erroneous. In one embodiment, the first communication may be blocked and may be later subject to subsequent testing to determine if it is actually erroneous for purposes of a binary value determination, which can be added to a communications database for subsequent updating of the iterative security list. If the first communication does not contain the attributes and/or variables that are included on the iterative security list, the first communication may be forwarded to its intended destination.

It should be noted that even if a large number of iterations are performed the embodiments described herein still represent an improvement to the accuracy of network security. The processes of determining the iterative security list uniquely identifies the most powerful variable associated with an attribute and uses that variable to determine erroneous communication. For example, with reference to Table 4, the most powerful type of device (that is used to send communications) can be determined. So instead of looking for a multitude of different device types when analyzing a communication, a communications mechanism may only need to search for one device type because that device type has been determined to be most powerful when determining an erroneous email. Thus, performing multiple iterations based on only the most powerful or the 2 most powerful, etc. variables, time may be saved when performing data analysis within a network. The techniques described herein may be used to apply not only to the most powerful variable, but also to the most powerful two or three variables. For example, with reference to Table 4, an iterative security list may look for if a device sending a communication is a Moto, Pixel, or Galaxy because those all have negative WoE values.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in any order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed:

1. A method comprising:
   receiving, by a communications mechanism of a computer system, a plurality of communications;
   scanning, by the communications mechanism, the plurality of communications;
   for each communication of the plurality of communications, identifying, by the communications mechanism, one or more attributes of the communication;
   based at least in part on the identifying, storing, by the communications mechanism, communication information corresponding to attributes of the plurality of communications;
   based at least in part on the attributes of the plurality of communications, generating, by the communications mechanism, an iterative security list applicable to communications to determine whether to allow or block the communications, the iterative security list comprising a set of iterative rules, where each iterative rule of the set of iterative rules is associated with an iteration value and at least one of the attributes; and
   providing, by the communications mechanism, the iterative security list to apply with subsequent communications to determine whether to allow or block each communication of the subsequent communications.

2. The method as recited in claim 1, where the plurality of communications are received from a communications database that stores past communications.

3. The method as recited in claim 1, where the one or more attributes of the communication are determined from data within the communication and/or data associated with the communication.

4. The method as recited in claim 1, further comprising:
   creating, by the communications mechanism, one or more partitions in storage for the one or more attributes;
   where the storing the communication information corresponding to the attributes of the plurality of communications comprises storing, for each communication, communication information associated with the one or more attributes in the one or more partitions.

5. The method as recited in claim 1, further comprising:
   applying, by the communications mechanism, the iterative security list to a filtering mechanism of the computer system.

6. The method as recited in claim 1, further comprising:
   specifying, by the communications mechanism, a particular attribute and variable combination to analyze one or more of the subsequent communications.

7. The method as recited in claim 1, where at least a subset of the subsequent communications is sequentially analyzed according to the iterative security list so that each communication of the subset is analyzed multiple times according to different iterative rules of the iterative security list to determine whether to allow or block the communication.

8. A system comprising:
   one or more processing devices; and
   memory coupled with the one or more processing devices and configured to store instructions that, when executed by the one or more processing devices, cause the one or more processing devices to perform operations:
      receiving a plurality of communications;
      scanning the plurality of communications;
      for each communication of the plurality of communications, identifying one or more attributes of the communication;
      based at least in part on the identifying, storing communication information corresponding to attributes of the plurality of communications;
      based at least in part on the attributes of the plurality of communications, generating an iterative security list applicable to communications to determine whether to allow or block the communications, the iterative security list comprising a set of iterative rules, where each iterative rule of the set of iterative rules is associated with an iteration value and at least one of the attributes; and
      providing the iterative security list to apply with subsequent communications to determine whether to allow or block each communication of the subsequent communications.

9. The system as recited in claim 8, where the plurality of communications are received from a communications database that stores past communications.

10. The system as recited in claim 8, where the one or more attributes of the communication are determined from data within the communication and/or data associated with the communication.

11. The system as recited in claim 8, the operations further comprising:
    creating one or more partitions in storage for the one or more attributes;
    where the storing the communication information corresponding to the attributes of the plurality of communications comprises storing, for each communication, communication information associated with the one or more attributes in the one or more partitions.

12. The system as recited in claim 8, the operations further comprising:
applying the iterative security list to a filtering mechanism of computer system.

13. The system as recited in claim 8, the operations further comprising:
specifying a particular attribute and variable combination to analyze one or more of the subsequent communications.

14. The system as recited in claim 8, where at least a subset of the subsequent communications is sequentially analyzed according to the iterative security list so that each communication of the subset is analyzed multiple times according to different iterative rules of the iterative security list to determine whether to allow or block the communication.

15. One or more non-transitory, computer-readable storage media having instructions stored thereon for causing one or more processing devices to perform operations comprising:
receiving a plurality of communications;
scanning the plurality of communications;
for each communication of the plurality of communications, identifying one or more attributes of the communication;
based at least in part on the identifying, storing communication information corresponding to attributes of the plurality of communications;
based at least in part on the attributes of the plurality of communications, generating an iterative security list applicable to communications to determine whether to allow or block the communications, the iterative security list comprising a set of iterative rules, where each iterative rule of the set of iterative rules is associated with an iteration value and at least one of the attributes; and
providing the iterative security list to apply with subsequent communications to determine whether to allow or block each communication of the subsequent communications.

16. The one or more non-transitory, computer-readable storage media as recited in claim 15, where the plurality of communications are received from a communications database that stores past communications.

17. The one or more non-transitory, computer-readable storage media as recited in claim 15, where the one or more attributes of the communication are determined from data within the communication and/or data associated with the communication.

18. The one or more non-transitory, computer-readable storage media as recited in claim 15, the operations further comprising:
creating one or more partitions in storage for the one or more attributes;
where the storing the communication information corresponding to the attributes of the plurality of communications comprises storing, for each communication, communication information associated with the one or more attributes in the one or more partitions.

19. The one or more non-transitory, computer-readable storage media as recited in claim 15, the operations further comprising:
applying the iterative security list to a filtering mechanism of a computer system.

20. The one or more non-transitory, computer-readable storage media as recited in claim 15, the operations further comprising:
specifying a particular attribute and variable combination to analyze one or more of the subsequent communications.

* * * * *